(12) United States Patent
Yamazaki

(10) Patent No.: US 6,307,960 B1
(45) Date of Patent: Oct. 23, 2001

(54) COLOR IMAGE READING APPARATUS AND COLOR IMAGE READING METHOD

(75) Inventor: Tsutomu Yamazaki, Sagamihara (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/157,380

(22) Filed: Sep. 21, 1998

(30) Foreign Application Priority Data

Sep. 25, 1997 (JP) ................................................ 9-260485

(51) Int. Cl.$^7$ .................................................... G06K 9/00
(52) U.S. Cl. ........................................... 382/162; 358/500
(58) Field of Search ........................................ 382/162, 165, 382/164; 358/500, 501, 505, 518, 530, 520, 396, 467, 453

(56) References Cited

U.S. PATENT DOCUMENTS

| | | | |
|---|---|---|---|
| 5,719,613 | 2/1998 | Fukui et al. | 347/132 |
| 5,737,100 * | 4/1998 | Funada | 358/501 |
| 5,768,403 * | 6/1998 | Suzuki | 382/165 |

\* cited by examiner

*Primary Examiner*—David Moore
*Assistant Examiner*—Negussie Worku
(74) *Attorney, Agent, or Firm*—Burns, Doane, Swecker & Mathis, LLP

(57) ABSTRACT

A color image forming apparatus includes a scanner, an image processor, and an print engine. The color image forming apparatus further includes an operation panel through which an operator can selectively set two different mode, i.e., speed mode and quality mode. In the speed mode, the scanner is set in a first scanning speed and the image processor executes a color masking process by using a first conversion matrix dedicated for the speed mode. On the other hand, in the quality mode, the scanner is set in a second scanning speed which is lower than the first scanning speed and the image processor executes a color masking process by using a second conversion matrix dedicated for the quality mode. By selectively using the first and second conversion matrices in response to the scanning speed, an appropriate color masking can be executed regardless change in the scanning speed.

14 Claims, 6 Drawing Sheets

COLOR IMAGE READING APPARATUS AND COLOR IMAGE READING METHOD

This application is based on application No. H9-260485 filed in Japan, the content of which is hereby incorporated by reference.

BACKGROUND OF THE INVENTION

1. Field of the Invention

The present invention pertains to a color image reading apparatus and a color image reading method to read color images, and more particularly, to a color image reading apparatus and a color image reading method in which scanning speed can be changed.

2. Description of the Related Art

In recent years, color image reading apparatuses that scan the image of an original document to read a color image and that can change speed of said scanning have been developed. The apparatuses are made capable of changing the scanning speed in order to meet mutually incompatible demands, i.e., to obtain a desired image quality and to improve the efficiency of the image input operation.

For example, where an extremely fine image is to be input, the scanning speed is set to be slow (image quality priority mode) to improve the reproducibility of fine lines. On the other hand, where a simple image for which fine line reproducibility is not an issue is input, the scanning speed is set to be fast (speed priority mode) to improve image input operation efficiency.

When the scanning speed is changed in this way, the amount of light received by the sensor changes from one speed to another, and the signal level (image data value) output from the sensor also changes. Therefore, the sensor output is corrected such that it becomes constant regardless of whether the scanning speed is set to slow or to fast.

However, in a conventional color image reading apparatus of this type, only the output correction mentioned above is performed based on the scanning speed, and therefore, a problem arises in the color reproducibility of the color image.

In other words, the problem arises that, when identical color masking conversion is carried out for images scanned using different speeds, a discrepancy or color imbalance occurs between the colors of the image read and the colors of the printed image, reducing the color reproducibility.

OBJECTS AND SUMMARY

The present invention was made in order to resolve the problem with conventional devices described above. Its object is to provide an improved color image reading apparatus or an improved color image reading method.

Another object of the present invention is to provide a color image reading apparatus or a color image reading method that maintains good color reproducibility when the scanning speed of the scanner is changed.

Yet another object of the present invention is to provide a color image reading apparatus or a color image reading method that changes the conversion parameters (matrix) for the color masking conversion in response to the scanning speed and in which color reproducibility does not change when the scanning speed of the scanner is changed.

In order to attain at least one of these and other objects, the color image reading apparatus of the present invention comprises: a scanner which scans an image to read the image and which outputs color image signals, said scanner being able to scan the image with at least two scanning speed; a color masking unit which converts the color image signals output from said scanner into print data corresponding to the print colors using conversion parameters; and a selector which alternates the conversion parameters used by the color masking unit in response to the scanning speed of the scanner.

According to another aspect of the present invention, an image processing apparatus for processing color image signals of an image originally scanned by a scanner comprises: a selector which selects one of conversion parameters in response to an input data, the input data representing at least one scanning speed of the scanner; and a color masking unit which converts the color image signals into output data for representing an image corresponding to the image signals, said color masking unit converting the image signals by using the conversion parameter selected by said selector.

BRIEF DESCRIPTION OF THE DRAWINGS

These and other objects and features of the present invention will become apparent from the following description of a preferred embodiment thereof taken in conjunction with the accompanying drawings, in which.

In the following description, like parts are designated by like reference numbers throughout the several drawings.

DETAILED DESCRIPTION OF THE PREFERRED EMBODIMENT

The present embodiment is a color image copying device in which the color reproducibility between the original image and the output image from the printer is maintained at a desired constant level even when the scanning speed is changed, by means of changing the conversion parameters used for the color masking conversion depending on the scanning speed of the scanner.

An embodiment of the present invention is explained below in detail with reference to the drawings. While a color image copying device is explained in this embodiment, the present invention may be applied in a color image reading device as well. In the case of a color image reading device, the construction is such that a printer is eliminated from the color image copying device.

Figure 1:
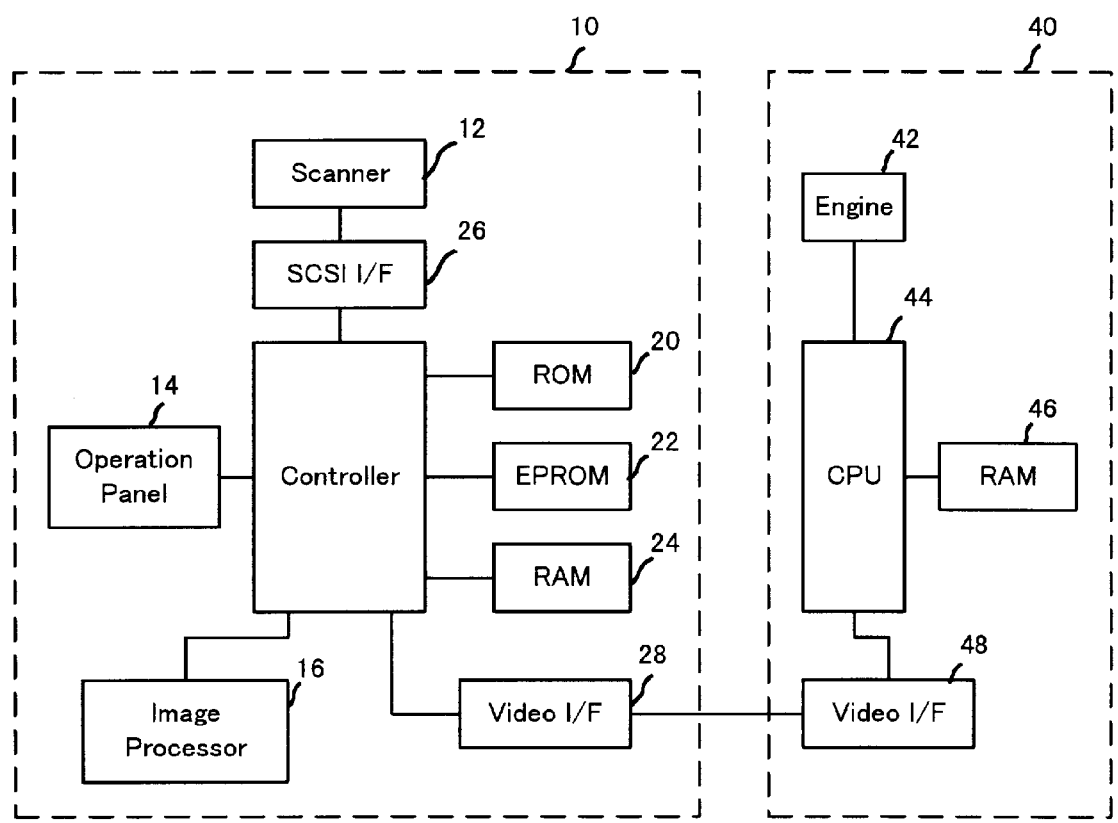
FIG. 1 is a block diagram outlining the construction of a color image copying device.

FIG. 1 is a block diagram outlining the construction of the color image copying device. The color image copying device comprises an image reader 10 and a printer 40. The color image copying device can read a full-color original document image and print it out in color. For the specific construction of the color image copying device, U.S. Pat.

No. 5,719,613 is used as a reference, and its explanation will be omitted here.

The image reader 10 has a function to scan and read an original document image. The image reader 10 performs scanning using different scanning speeds depending on whether the scanning speed mode, which is described below, is set to 'speed' and when it is set to 'quality'.

The scanner 12 has a line sensor using, for example, CCDs. The scanner 12 performs scanning using the scanning speed corresponding to the set scanning speed mode, reads the original document image placed on the platen glass, and outputs image data, which is color data comprising R (red), G (green) and B (blue) components. This image data is stored in a RAM 24. The scanning speed of the scanner 12 can be changed through the setting of an SCSI command mode. The scanner 12 has an automatic original document feeder for improved efficiency of the reading operation.

Figure 3:
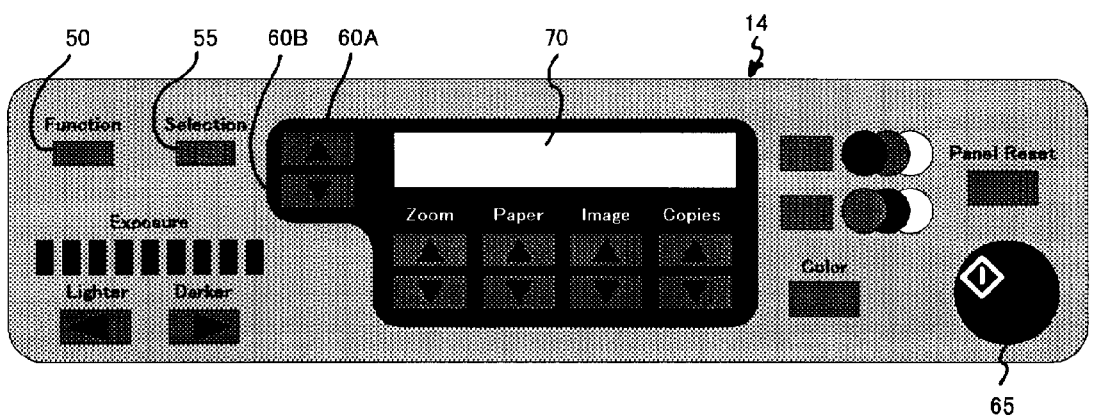
FIG. 3 is a drawing showing the key arrangement on the operation panel of the color image copying device.

The operation panel 14 has keys as shown in FIG. 3. Through this operation panel 14, setting of the printer 40 as a regular copying machine as well as alternate setting of the scanning speed mode of the image reader 10 between 'speed' and 'quality' can be performed.

The image processor 16 performs a series of image processing operations including conversion of the read color data comprising three components (R, G, B) into color data comprising four components (cyan, magenta, yellow and black, or C, M, Y and K), differentiation between letter areas and photo areas, edge enhancement, and smoothing.

The controller 18 controls the operation of the scanner 12, performs the processing to convert the resolution of the image data read or stored in the RAM 24 in order to display it on the screen of a display device not shown in the drawings, and controls the communication through the SCSI interface 26 and the video interface 28, the display on the operation panel 14, and the data in the image processor 16, the ROM 20, the EPROM 22 and the RAM 24.

Stored in the ROM 20 is a program to control the image reader 10.

Stored in the EPROM 22 are the color reproduction parameters, startup settings for the printer 40 and a total counter that shows the number of copies.

The RAM 24 stores the image data for the original document image read by the scanner 12 and the CMY conversion matrix.

The SCSI interface 26 is generally a standard interface used to connect a personal computer and peripheral devices. It is here used to connect the scanner 12 and the controller 18. The scanning speed of the scanner 12 is set to a desired mode based on the SCSI command output from this SCSI interface 26.

The video interface 28 is a dedicated image interface for the printer 40. The transmission of control signals and image data between the image reader 10 and the printer 40 is carried out through this video interface 28.

The printer 40 is a laser printer capable of color printing. The printer 40 receives image data corresponding to the original image read by the image reader, and prints out images based on the received image data.

The engine 42 receives image data through the video interface 28 connected to the image reader 10. This image data is color data comprising the four components of C (cyan), M (magenta), Y (yellow) and K (black). The engine 42 carries out printing using toner of these four colors.

The CPU 44 receives image data from the image reader 10 and performs control of the engine 42 and the transmission through the video interface 48.

The RAM 46 is used to temporarily store the image data received from the image reader 10.

The video interface 48 has the same functions as the video interface 28.

Figure 2:
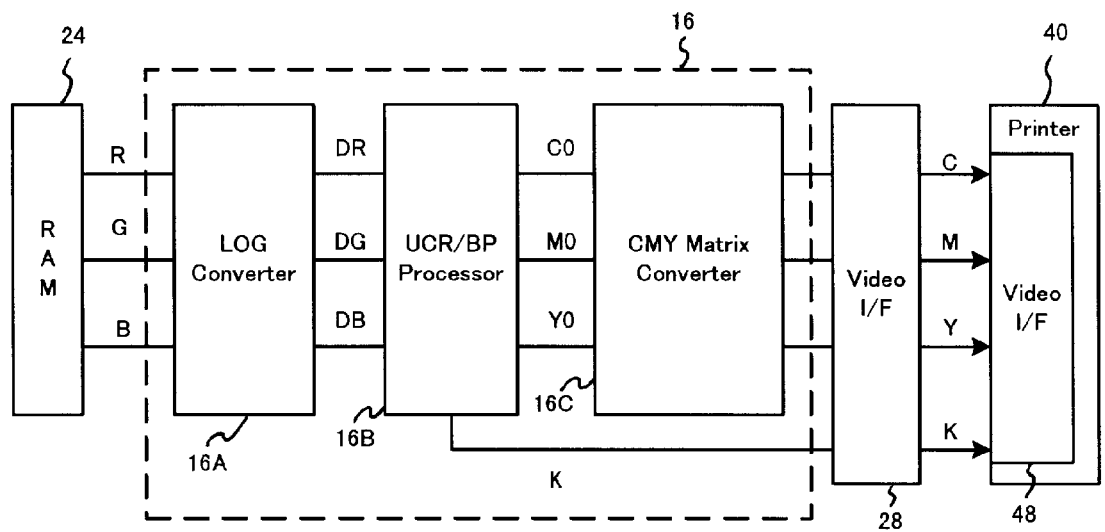
FIG. 2 is a block diagram outlining the construction of the part concerning color masking conversion.

FIG. 2 is a block diagram outlining the construction of the part concerning the color masking conversion. Since the functions of the RAM 24, the video interfaces 28 and 48, and the printer 40 are as described above, their explanations will be omitted.

As shown in the drawing, the image processor 16 comprises a logarithmic converter 16A, a UCR/BP processor 16B and a CMY matrix converter 16C.

The logarithmic converter 16A has a function to convert the RGB image data output from the RAM 24 into density data DR, DG and DB.

Figure 7:
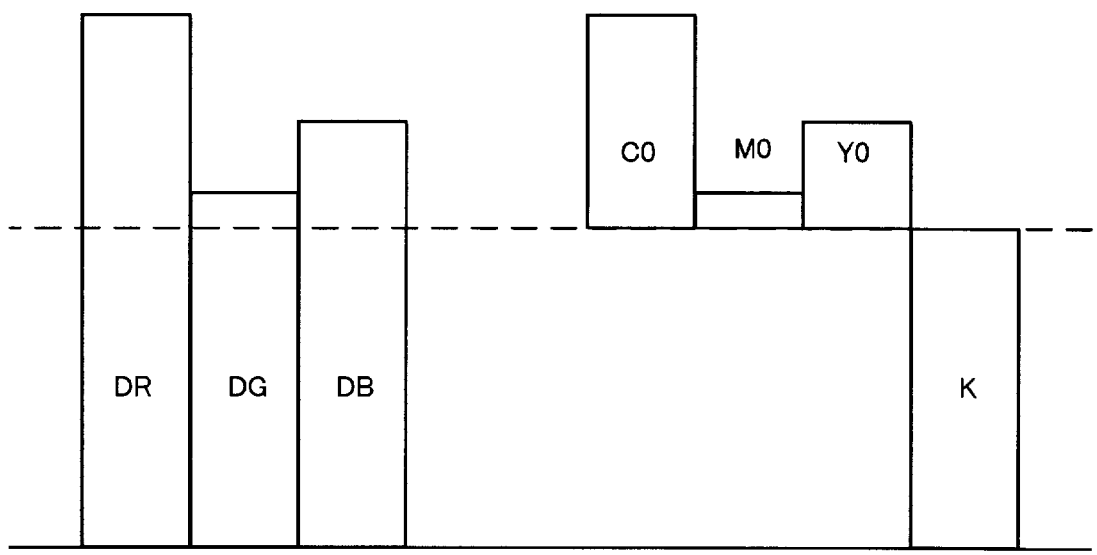
FIG. 7 is a drawing showing the processing performed by the UCR/BP processor.

The UCR/BP processor 16B replaces the common part of the DR, DG and DB density data after logarithmic conversion with K (black) data, as shown in FIG. 7, and creates CO, MO and YO data by subtracting the substituted K (black) data from the DR, DG and DB density data. The CO, MO and YO data is sent to the CMY matrix converter 16C described below while the K data is directly sent to the video interface 28.

The CMY matrix converter 16C has a function to alternate the conversion parameters, i.e., the CMY conversion matrix, in response to the scanning speed mode set in the image reader 10. The CMY matrix converter 16C outputs CMY density data that is appropriate for the scanning speed.

For example, where the scanning speed mode of the image reader 10 is set to 'quality', the CO, MO and YO data is converted into C, M and Y data using the CMY conversion matrix formula shown below, which is used when the reading speed is slow.

$$\begin{bmatrix} CL1 & CL2 & CL3 \\ ML1 & ML2 & ML3 \\ YL1 & YL2 & YL3 \end{bmatrix} \begin{bmatrix} C0 \\ M0 \\ Y0 \end{bmatrix} = \begin{bmatrix} C \\ M \\ Y \end{bmatrix}$$

Where the scanning speed mode of the image reader 10 is set to 'speed', the CO, MO and YO data is converted into C, M and Y data using the CMY conversion matrix formula shown below, which is used when the reading speed is fast.

$$\begin{bmatrix} CH1 & CH2 & CH3 \\ MH1 & MH2 & MH3 \\ YH1 & YH2 & YH3 \end{bmatrix} \begin{bmatrix} C0 \\ M0 \\ Y0 \end{bmatrix} = \begin{bmatrix} C \\ M \\ Y \end{bmatrix}$$

Among these matrix formulae, the variables for the first terms (CL1, CL2, CL3, ML1, ML2, ML3, YL1, YL2, YL3, CH1, CH2, CH3, MH1, MH2, MH3, YH1, YH2, the following manner.

The image data, which works as the base, is printed out by the printer without being processed by the CMY matrix converter (print output A). This printout is read by the scanner and printed by the printer (print output B). The images of the print output A and of the print output B are compared and the variables of the matrix formula are adjusted such that the print output B will have the same color tones as the print output A. The values that are determined in this adjustment are used as the values for the variables in the matrix formula above. Thereafter, when the same adjustment is performed using a different scanning speed, the variables for the matrix formula appropriate for the scanning speed, i.e., conversion parameters, are obtained.

FIG. 3 is a drawing showing the key arrangement on the operation panel 4 of the color image reading device of the present embodiment.

When the function key 60 in the drawing is pressed, the printing mode in the printer 40 changes. When the select key 56 is pressed, finer settings are performed in the mode set by means of the function key 50. In this embodiment, the select key 55 is used to set the scanning speed mode of the scanner 12 to 'quality' or 'speed'.

The zoom-up key 60A and the zoom-down key 60B are used to select a scanning speed mode ('quality' or 'speed'). 'Speed' is selected as the scanning speed mode when zoom-up key 60A is pressed and 'quality' is selected when the zoom-down key 60B is pressed.

The start key 65 is a key to start the reading operation for the scanner 12. The LCD 70 displays various messages including mode setting information.

The construction of the hardware of the color image copying device is explained above. The operation procedure of the device will now be explained with reference to the flow charts of FIGS. 4 through 6.

Figure 4:
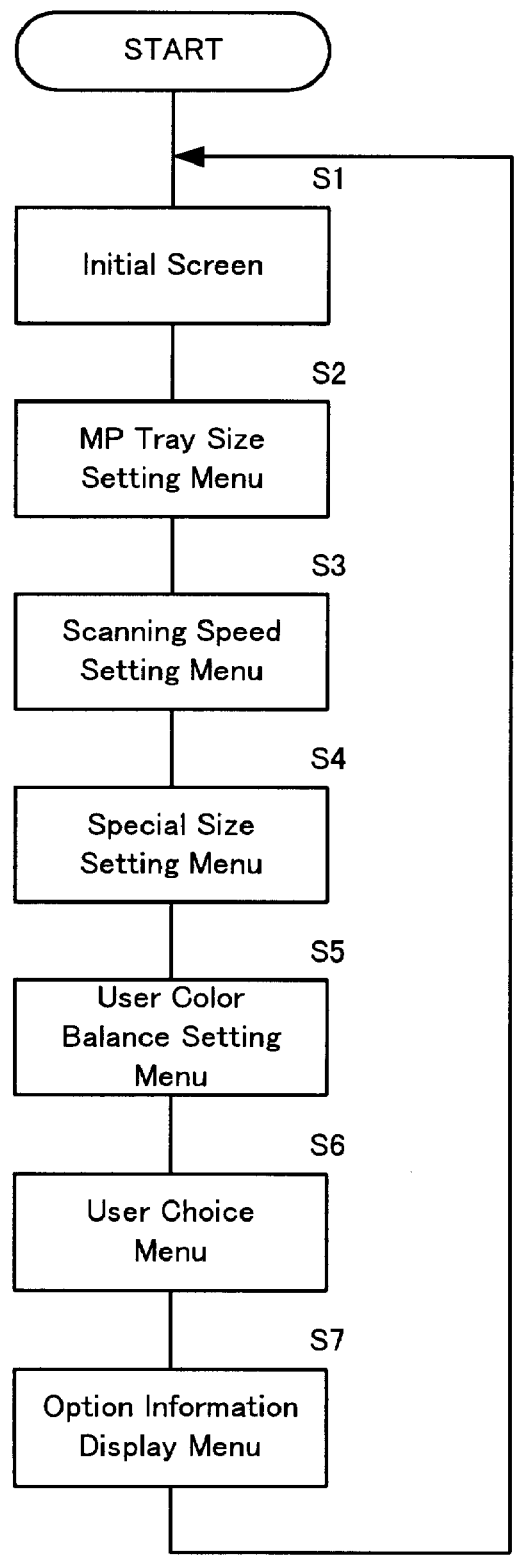
FIG. 4 is a flow chart showing the order of the modes selected by means of the function keys on the operation panel.

FIG. 4 is a flow chart that shows the changes to the menu screen that are selected through the operation of the function key 50 on the operation panel 14 and displayed on the LCD 70.

When the power to the device is turned ON, an initial screen, which is the initial screen for this device, is shown on the LCD 70 on the operation panel 14 (S1). When the function key 50 is pressed, an MP tray paper size setting menu is selected, and the display on the LCD 70 changes to a screen to set a paper size (S2). When the function key 50 is then pressed, a scanning speed setting menu is selected and the LCD 70 changes to a screen to set a scanning speed. The processing operations that take place using this menu will be explained in detail using the flow charts of FIGS. 5 and 6 (S3).

Thereafter, each time the function key 50 is pressed, the mode sequentially changes to a special size setting menu used when selecting special paper (S4), a user color balance setting menu used when the user freely adjusts the color balance (S5), a user choice menu (S6) and an option information display menu (S7). When the function key 50 is pressed again, the display returns to the initial screen.

It is necessary to press the select key 55 in order to execute the selected menu operations. By pressing the select key 55, the menu selection is confirmed and the selected menu operation is executed.

Figure 5:
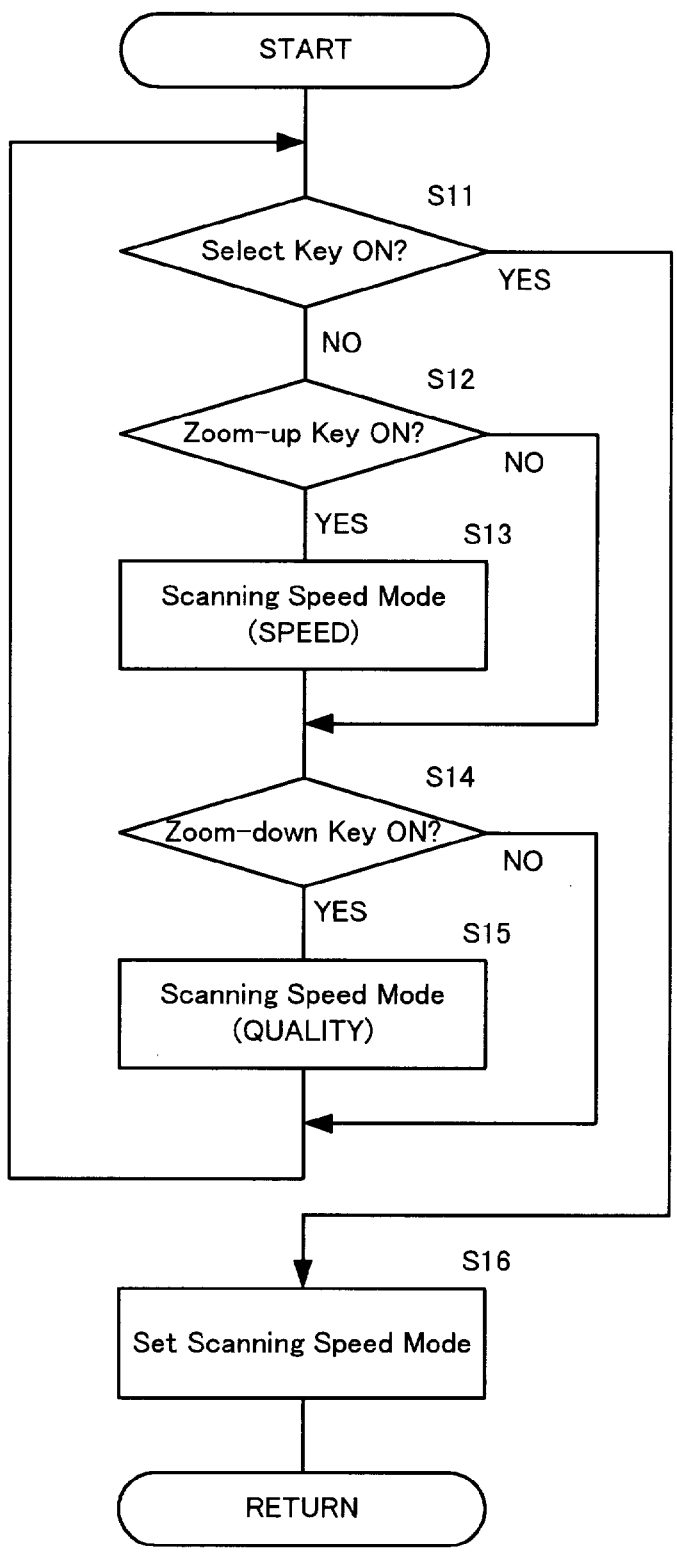
FIG. 5 is a flow chart showing the selection of a scan mode.

FIG. 5 is a flow chart showing the selection of a scan mode, which is related to the present invention. It shows the routine that takes place when a step S3 is selected in the flow chart of FIG. 4 and the select key 55 is pressed.

Where the scanning speed setting menu is selected, 'speed' scanning speed mode is selected by pressing the zoom-up key 60A (S12, S13). On the other hand, if the zoom-down key 60B is pressed, 'quality' scanning speed mode is selected (S14, S15).

After this selection, when the select key 55 is pressed (811), the scanning speed is set to the selected scanning speed mode ('quality' or 'speed': S16).

Figure 6:
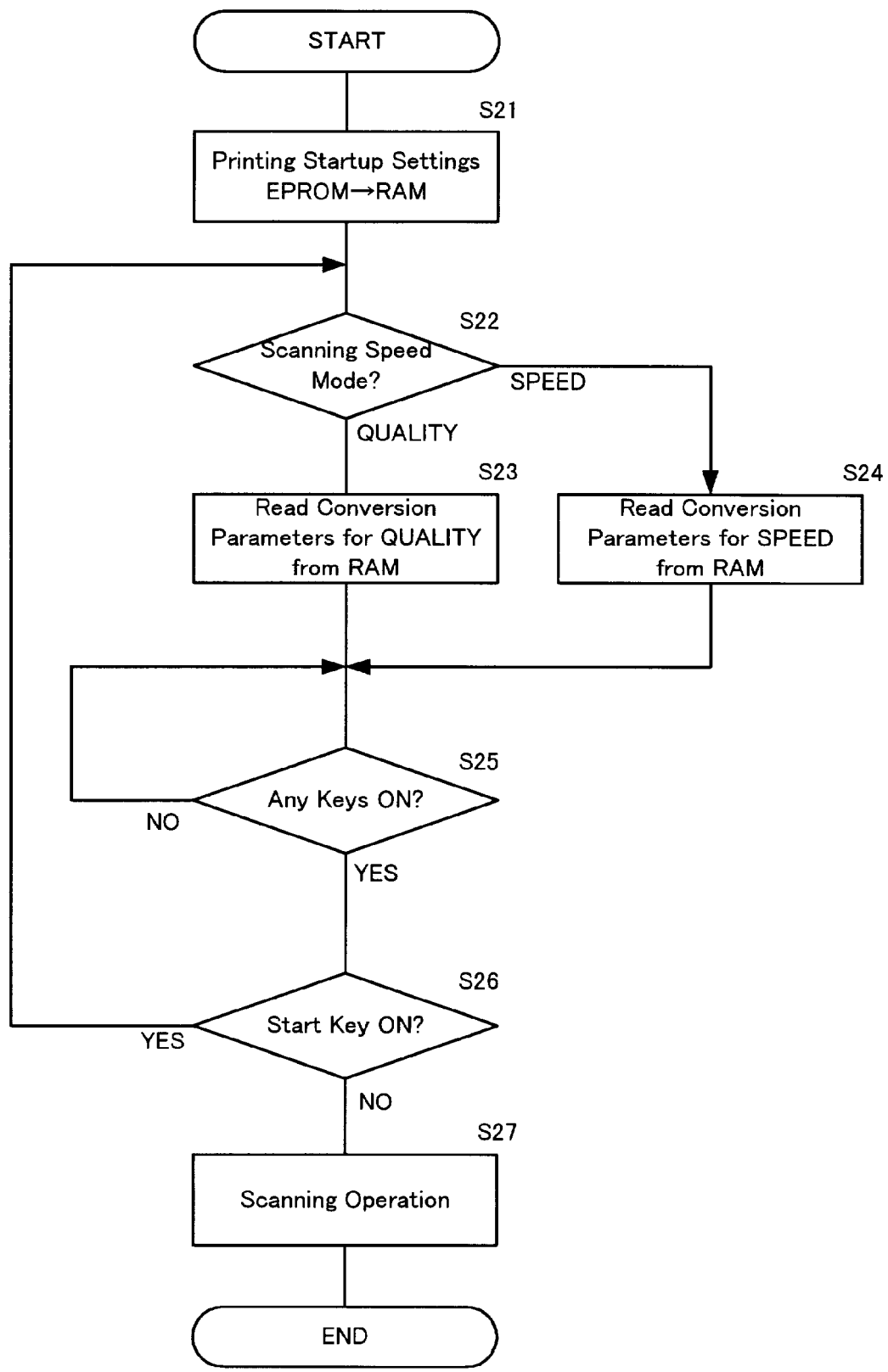
FIG. 6 is a flow chart showing a sequence of the scanning operation.

FIG. 6 is a flow chart showing the sequence of the scanning operation.

First, when power to the color image reading device is turned ON, the controller 18 reads the printing startup settings from the EPROM 22 and stores them in the RAM 24 (S21).

Where the scanning speed mode is set to 'quality' through the key operation explained with reference to the flow charts of FIGS. 4 and 5, the CMY conversion matrix (conversion parameters) used when the reading speed is slow is read from the RAM 24 and is set in the CMY matrix converter 16C of the image processor 16 (S22, S23). On the other hand, where the scanning speed mode is set to 'speed', the CMY conversion matrix used when the reading speed is fast is read from the RAM 24 and is set in the CMY matrix converter 16C of the image processor 16 (S22, S24).

When the start key 65 is then pressed (S25), the controller 18 sends necessary setting commands, such as the set scanning speed mode, the original document image reading range and the resolution, to the scanner 12. The controller 18 also operates the scanner 12 at the selected scanning speed, reads the original document image placed on the platen glass and writes it into the RAM 24. The controller 18 activates the printer 40 through the video interfaces 28 and 48. The image processor 16 creates CMY density data for the image data stored in the RAM 24, that is appropriate to the present scanning speed using the CMY conversion matrix (conversion parameters) set in the step S23 or S24 while changing the color conversion table in the order of development by means of the printer 40. The printer 40 performs printing based on this CMY density data (S27).

Where the function key 50 is pressed in the step S25 and a scanning speed mode is selected again, a CMY conversion matrix formula is read from the RAM 24 in response to the selection and is set in the CMY matrix converter 16C of the image processor 16 (S26).

As described above, in a full-color scanner, where the scanning speed is changed, the converted CMYK values vary due to the RGB balance when only exposure correction is performed, and the color tones change in the output for the same original document image each time the scanning speed changes, but as in the present invention, by having conversion parameters (the color conversion matrix) adjusted based on the post-exposure correction data output from the scanner, i.e., an RGB-CMY conversion matrix, for each scanning speed mode and by performing color conversion using conversion parameters appropriate for the set scanning speed, constant color reproducibility can be obtained at all times regardless of the scanning speed.

Since the conversion parameters used for the color masking conversion are changed depending on the scanning speed, the color balance of the reading output (color image signal) can be stabilized regardless of the change in scanning speed.

In accordance with the above mentioned embodiment, the scanning speed mode can be set for each job. However, the scanning speed mode may be changed during one job. That is, for example, the first page of documents of a specific job may be read in the "quality" mode while the second page of the documents of the specific job may be read in the "speed" mode. Further to this, the scanning speed mode may be changed in one page. That is, for example, the former part of a specific page which includes a photo-image may be read in the "quality" mode while the latter part of the specific page which only includes a character-image may be read in the "speed" mode. In these cases, the change in conversion matrix should be executed in response to the change in the scanning speed.

Although the present invention has been fully described by way of examples with reference to the accompanying drawings, it is to be noted that various changes and modifications will be apparent to those skilled in the art.

Therefore, unless such changes and modifications depart from the scope of the present invention, they should be construed as being included therein.

What is claimed is:

1. A color image reading device comprising:
   a scanner which scans an image to read the image and which outputs color image signals, said scanner being able to scan the image with at least two scanning speeds;
   a color masking unit which converts the color image signals output from said scanner into print data corresponding to the print colors using conversion parameters; and
   a selector which alternates the conversion parameters used by the color masking unit in response to the scanning speed of the scanner.

2. The color image reading apparatus of claim 1, further comprising:
   an operation panel through which an operator sets a specific scanning speed, wherein said scanner reads the image at the specific scanning speed set through said operation panel.

3. The color image reading apparatus of claim 1, wherein the various scanning speeds includes a first speed and a second speed lower than said first speed.

4. The color image reading apparatus of claim 1, further comprising:
   a memory which stores the conversion parameters,
   wherein said selector selectively sets one of the conversion parameters stored in said memory to said color masking unit in response to the scanning speed of the scanner.

5. An image reading method comprising the steps of:
   (a) scanning an image at a specific scanning speed which is selected from at least two scanning speeds and outputting color image signals;
   (b) selecting one of conversion parameters in response to the specific scanning speed; and
   (c) converting the color image signals output in step (a) into print data corresponding to the print colors by using the conversion parameter selected in step (b).

6. The image reading method of claim 5, further comprising the step of:
   (d) selecting the specific scanning speed from an operation panel,
   wherein the step (d) is executed before the step (a).

7. The image reading method of claim 5, wherein the various scanning speeds includes a first speed and a second speed lower than said first speed, wherein the first scanning speed is for enhancing scanning efficiency and the second scanning speed is for enhancing image quality.

8. The image reading method of claim 5, the step (b) comprising the steps of:

(b-1) storing the conversion parameters in a memory; and
(b-2) selecting one of the conversion parameters stored in the memory.

9. An image processing apparatus for processing color image signals of an image originally scanned by a scanner, said image processing apparatus comprising:
   a selector which selects one of conversion parameters in response to an input data, the input data representing at least one scanning speed of the scanner; and
   a color masking unit which converts the color image signals into output data for representing an image corresponding to the image signals, said color masking unit converting the image signals by using the conversion parameter selected by said selector.

10. The image processing apparatus of claim 9, further comprising:
   a memory which stores the conversion parameters,
   wherein said selector selectively sets one of the conversion parameters stored in said memory to said color masking unit in response to the input data.

11. The image processing apparatus of claim 10, wherein the conversion parameters includes a first conversion parameter and a second conversion parameter, said first conversion parameter being for a first scanning speed of the scanner and said second conversion parameter being for a second scanning speed of the scanner, the second scanning speed being lower than the first scanning speed.

12. An image processing method for processing color image signals of an image originally scanned by a scanner, said image processing method comprising the steps of:
   (a) selecting one of conversion parameters each of which is for color masking in response to an input data, the input data representing at least one scanning speed of the scanner; and
   (b) converting the color image signals into output data for representing an image corresponding to the image signals by using the conversion parameter selected in step (a).

13. The image processing method of claim 12, further comprising the step of:
   (c) storing the conversion parameters in a memory,
   wherein one of the conversion parameters stored in said memory is set to said color masking unit in step (a).

14. The image processing method of claim 13, wherein the conversion parameters includes a first conversion parameter and a second conversion parameter, said first conversion parameter being for a first scanning speed of the scanner and said second conversion parameter being for a second scanning speed of the scanner, the second scanning speed being lower than the first scanning speed.

* * * * *